(12) United States Patent
Durif

(10) Patent No.: US 6,631,747 B2
(45) Date of Patent: Oct. 14, 2003

(54) ASSEMBLY FOR MOUNTING A TIRE ON A HUB

(75) Inventor: Pierre Durif, Enval (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 09/989,917

(22) Filed: Nov. 21, 2001

(65) Prior Publication Data

US 2002/0046794 A1 Apr. 25, 2002

Related U.S. Application Data

(63) Continuation of application No. PCT/EP00/03827, filed on Apr. 27, 2000.

(30) Foreign Application Priority Data

May 25, 1999 (FR) .............................. 99 06613

(51) Int. Cl.[7] .............................................. B60C 25/00
(52) U.S. Cl. ...................................... 152/409; 152/410
(58) Field of Search ................................. 152/409, 410, 152/402, 396; 301/95.101, 99, 35.3

(56) References Cited

U.S. PATENT DOCUMENTS

| 3,635,274 | A | * | 1/1972 | Bradley et al. ............. 152/410 |
|---|---|---|---|---|
| 3,913,653 | A | | 10/1975 | Verdier |
| 4,554,961 | A | * | 11/1985 | Osawa et al. ............... 152/410 |
| 4,706,723 | A | | 11/1987 | Loeber et al. |
| 4,721,142 | A | * | 1/1988 | Foster ......................... 152/410 |
| 5,018,795 | A | * | 5/1991 | Engerand et al. ...... 301/64.702 |
| 5,083,597 | A | * | 1/1992 | France ....................... 152/410 |
| 5,232,033 | A | | 8/1993 | Durif |
| 5,259,430 | A | | 11/1993 | Smith et al. |
| 5,476,128 | A | * | 12/1995 | Jankowski et al. ......... 152/409 |
| 5,890,526 | A | | 4/1999 | Taylor |
| 6,293,324 | B1 | * | 9/2001 | Taylor ........................ 152/409 |
| 6,298,891 | B1 | * | 10/2001 | Harris ........................ 152/382 |

FOREIGN PATENT DOCUMENTS

| FR | 2087770 | 12/1971 |
|---|---|---|
| FR | 2677304 | 4/1992 |
| WO | 9925572 | 5/1999 |

* cited by examiner

*Primary Examiner*—S. Joseph Morano
*Assistant Examiner*—Long Bao Nguyen
(74) *Attorney, Agent, or Firm*—Baker Botts L.L.P.

(57) ABSTRACT

An assembly for mounting a tire without independent inner tube including two conical metal mounting rings intended to receive the tire beads, positioned and locked on the hub of the vehicle by means of two circular lateral locking rings recessed in a hub, each locking ring being composed of a vulcanized rubber mix reinforced by and coating a reinforcement ring which is circumferentially elastic and radially resistant to compression.

17 Claims, 3 Drawing Sheets

ASSEMBLY FOR MOUNTING A TIRE ON A HUB

This is a continuation of pending PCT/EP00/03827, filed Apr. 27, 2000 and published in French as WO 00/71365 on Nov. 30, 2000.

BACKGROUND OF THE INVENTION

The invention relates to a rim or assembly of elements forming a rim for the mounting and travel of a tire without an independent inner tube, that is to say, a "tubeless" tire, which is intended more particularly for mounting on heavy vehicles.

If we consider the rims of rolling assemblies which are currently used, we can distinguish mainly between drop-center rims, having frustoconical seats which are inclined relative to the axis of rotation of the assembly by an angle of 5° or 15°, and flat-based or practically flat-based rims having seats inclined at 0° or at 5° relative to the axis of rotation.

So-called drop-center rims comprise a mounting groove, the diameter of which is significantly less than the nominal diameter of the rim. This internal diameter of the rim is considered by users to be too small because it does not make it possible to select, for example, brake drums of dimensions suitable for effective braking of vehicles which are becoming ever more powerful relative to their weight.

Because of this, said rims are commonly used for mounting and travel, for example, of passenger-car and/or heavy-vehicle tires, but far less often, and sometimes not at all, for other types of vehicles, such as, for example, site machinery and construction machinery.

For mounting a "tubeless" tire, a flat-based rim requires the presence of at least one removable lateral ring, a locking ring and a gasket, and obviously the rim base provided with a fixed flange on the side opposite the side from which the parts are removable. Therefore at least three parts are required. In the majority of cases, the number of parts necessary is greater than three, and may sometimes be as many as six parts for large dimensions of tires. With the exception of the rubber gaskets, the parts of a rim are metal, and consequently heavy, bulky and difficult to handle. As a result, the fitting and removal of tires of large and very large dimensions are difficult, long operations. The positioning and/or removal of a wheel fitted with such a tire requires immobilization of the vehicle or machinery for a not inconsiderable period. Furthermore, the metal parts used, namely the conical rings, the flanges and the locking rings, are frequently subject to localized, partial wear, with or without oxidation and rusting, and this damage, during later use, results not only in defective mounting with loss of pressure, but also the creation of concentration of stresses which may result in breakage of parts. Moreover, as is known, the vulcanized rubber gaskets require great care in positioning; furthermore, they are subject to natural oxidation and poor storage conditions, hence the appearance of numerous cracks; thus, in many cases, the conditions are such that said gaskets do not satisfactorily fulfil the function for which they were intended.

SUMMARY OF THE INVENTION

In order to overcome the above disadvantages, to use the smallest possible number of parts and to ensure better connection of the rolling assembly to the wheel over time, the invention proposes a novel assembly for mounting a tire without independent inner tube, comprising at least two conical metal rings intended to receive the tire beads, said two metal rings being positioned and locked on the hub of the vehicle by means of two circular lateral locking rings, each being composed of a vulcanized rubber mix reinforced by and coating a reinforcement ring which is circumferentially elastic and radially resistant to compression, and being placed in a recess in the hub.

"Circumferentially elastic reinforcement ring" is to be understood to mean an element, the circumferential development of which is liable to be elongated by at least 3% under a force of at most 50 daN, and which returns to its initial state when the force is removed.

"Reinforcement ring radially resistant to compression" is to be understood to mean a ring, the maximum radial dimension of the cross-section, that is to say, the greatest radial distance between two points of the contour of said section which are located on a line perpendicular to the axis of rotation of the rim, of which is reduced by at most 2% under force.

"Conical mounting ring" is to be understood to mean a ring having radially to the outside a seat, the generatrix of which forms a certain angle with the direction of the axis of rotation, but also a ring, the seat of which has a generatrix which forms a zero angle with said axis.

"Vulcanized rubber mix" or "vulcanized rubber composition" is to be understood to mean a mix of elastomer(s), reinforcing fillers and well-known additives which are vulcanized at a certain temperature. Preferably, the coating mix of the reinforcement ring will have a secant modulus of elasticity at a relative elongation of 10% of at least 6 MPa.

A circular rubber ring reinforced by a circular reinforcement ring, said ring being circumferentially elastic and radially resistant to compression, is described in U.S. Pat. No. 5,232,033. Said rubber ring, in the cited patent, is used as an adapter, that is to say, a means having a meridian section adapted so as to be able to mount tire beads having a given configuration on rims intended to receive beads of a different configuration. The ring thus used is a bead mounting ring with, in particular, a radially outer wall of meridian profile identical to the standardized profiles, when it is a tire which meets the current standards which is being mounted. The invention uses such a reinforced rubber ring in an adapted form, not as an adapter or mounting ring, but as a locking ring, the mounting rings, within the scope of the invention, being of metal and not of rubber.

A locking ring according to the invention is considered as having at least two walls: one radially inner wall and one radially outer wall, said two walls possibly being joined by lateral walls virtually perpendicular to the direction of the axis of rotation. The radially inner wall is of a shape which is similar to the shape or profile of the recesses or grooves formed on the hub of the machine in order to receive said rings. Said recesses, when viewed in meridian section, may be of any shape, but preferably have a meridian section, the surface of which is virtually triangular with a base on the generatrix of the hub and with two sides forming acute angles which may be between 10° and 45° with the direction parallel to the axis of rotation, the two sides being joined opposite said base by a rounded apex, in order to minimize the concentrations of stresses and the risk of cracking due to fatigue. The virtual height of said triangle, lowered by the rounded apex on said base, is preferably between 10 and 45 mm. The radially inner wall of the locking ring, in meridian section, has a profile identical to the inner profile of the virtual triangle above.

The meridian section of the reinforcement ring of the locking ring, in its radially inner part, may be of any shape insofar as a major part of the maximum radial dimension of its meridian section lies within the triangular section of the recess formed in the hub. "Major part" is to be understood to mean a radial distance equal to at least 25% of the maximum radial dimension of the section of the reinforcement ring. Said radially inner part of the reinforcement ring may have two preferred shapes: elliptical (the circle being considered as an ellipse) and polygonal with at least two sides substantially parallel to the two sides of the triangular section of the recess of the hub, which permits correct positioning of the elastic locking ring and allows said positioning to be maintained despite the forces or stresses which arise upon inflation, loading and travel of the tire.

As for the meridian section in the radially outer part of the locking ring, it may also be elliptical in shape, but will preferably be composed of at least one frustoconical part, the generatrix of which forms an angle which may be between 15° and 35° with the direction of the axis of rotation. Said frustoconical part, upon mounting of the tire, will come to be opposite the frustoconical part of the radially inner wall of the conical ring on which the tire bead will be mounted. The meridian section of the reinforcement ring, in its radially outer part, may then be elliptical, circular or polygonal with, in the latter case, one side parallel to the frustoconical part of the radially outer wall of the ring.

Whatever the form of the meridian section of the reinforcement ring, the latter is advantageously an annular spring with adjacent metal coils. An individual coil may have any cross-section, but it is preferably circular, and the diameter of the cross-section of the coil, depending on the dimensions of the spring, is between 2 and 8 mm, which permits deformation of the coil under compressive force of less than 2%. The reinforcement ring may also be a succession of cylindrical elements of rigid material, such as steel, or ceramic, said elements being of a length less than the diameter of the cylinder and joined together circumferentially by a rubber mix of high Shore A hardness.

In the case in which a spring is used, the compressive strength of said spring may advantageously be improved by inserting within the coils either a continuous circular element of vulcanized rubber of high Shore A hardness, or a continuous circular element of plastics material, said elements being circularly discontinuous in order to maintain the elasticity of the spring.

Said spring, in order to facilitate the operations of demounting the tire and removing the locking ring, is provided with a cord or metal strap which makes it possible to dislodge the ring from the recess in the hub by means of a tensile stress exerted on said cord.

The metal mounting ring is a metal element composed of a rim seat, which is generally frustoconical although it may be cylindrical, or other, said seat being extended axially and radially to the outside by a rim flange, said flange possibly being independent of the seat and being removable relative to said seat. Said ring has a radially inner wall formed of at least one frustoconical part, the generatrix of which forms an angle of between 15° and 35° with the direction of the axis of rotation, whereas the radially outer wall, viewed in meridian section, is composed firstly of a frustoconical generatrix forming an angle which may be between 0° and 16° with the direction of the axis of rotation, and, secondly, extending said generatrix axially to the outside by means of an arc of a circle of the curve representing the axially inner and radially outer profile of the rim flange. Said curve in all cases is advantageously located radially to the outside and axially to the inside of a straight-line segment joining the point of intersection of said curve with the frustoconical generatrix above and that point of said curve which is farthest from the axis of rotation. Thus, said curve may be formed of an arc of a circle which is at a tangent to the arc of a circle connecting the frustoconical generatrix and the curve. It may also be formed of a straight-line segment whether or not perpendicular to the axis of rotation, which is at a tangent radially to the inside to the above connecting arc and radially to the outside to a second arc of a circle so as to obtain the desired curve. The metal mounting rings may be independent of the tire and more particularly of the beads of said tire. So as to facilitate and accelerate the mounting and demounting operations, as well as the various handling operations, the conical rings with seats and flanges form an integral part of the tire in the same way, for example, as the bead wires; said rings may be rendered integral with the beads of the tire by a press-fitting without any possibility of detachment. Such a principle is described in U.S. Pat. No. 3,913,653.

Whether or not integral with the beads of the tire, and in order to permit easier handling of the elements which are to be positioned, the metal bead mounting rings are advantageously provided in their axially inner parts with an air-cushion system, which makes it possible to have and to maintain a free space between the hub and the radially inner part of the rings during the mounting operations, which results in greatly improved axial displacement. Said free space of 5 to 20 mm is also intended to permit engagement by sight on the hub without squeezing the tire/metal ring assembly.

The invention is more fully described with reference to non-limitative embodiments which are illustrated in the accompanying drawings.

DETAILED DESCRIPTION OF THE INVENTION

Figure 1:
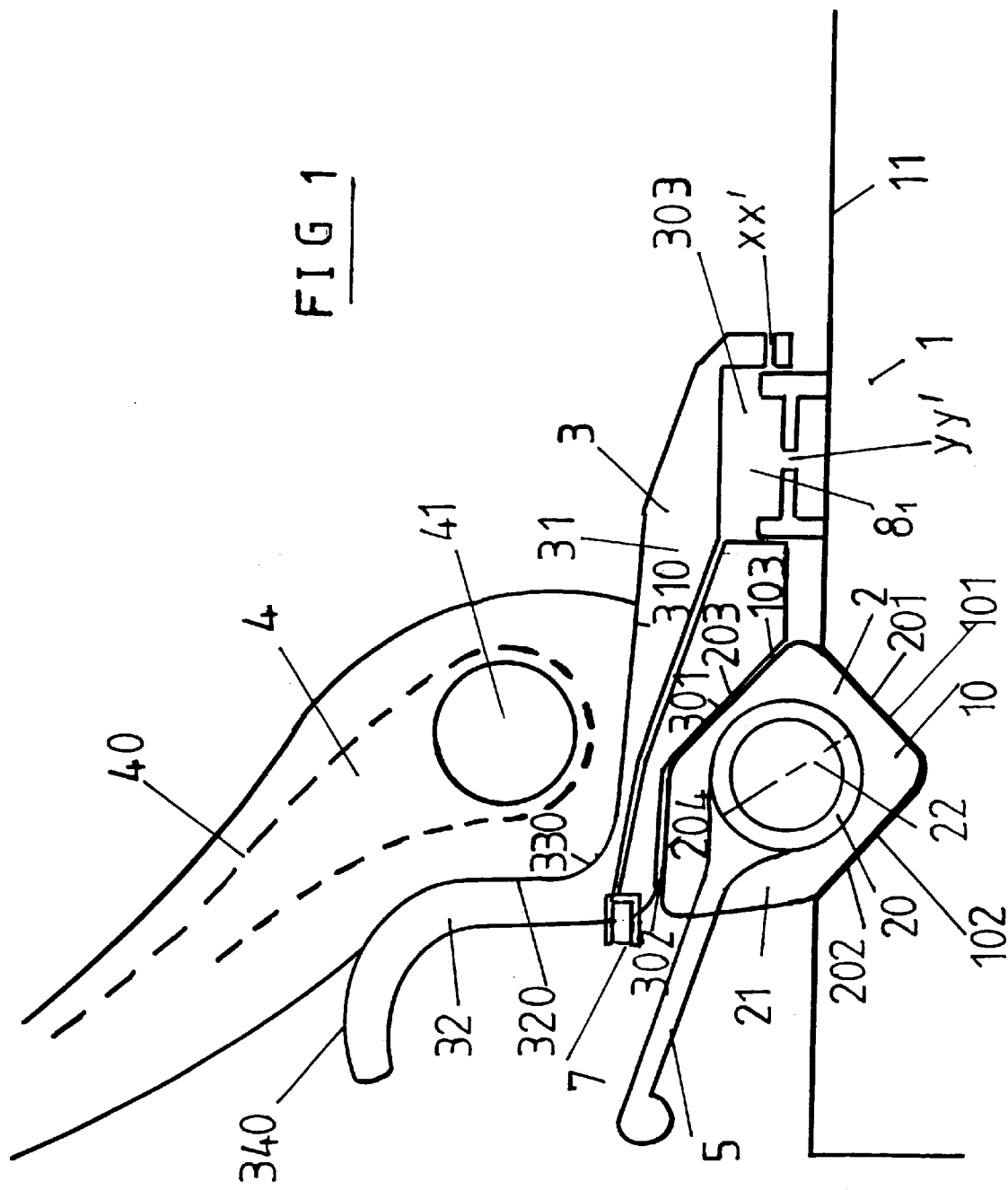
FIG. 1 is a schematic in meridian section of a first variant according to the invention.

FIG. 1 shows only the bead 4 of a large-dimension tire which is intended to be mounted on construction machinery. Said bead is mainly reinforced by a bead wire 41 around which the radial carcass reinforcement 40 of said tire is anchored by winding. The bead 4 has radially inner and axially outer walls of a shape and dimensions intended to be mounted on a metal mounting ring 3, composed of a frustoconical seat 31, the generatrix 310 of which, when viewed in meridian section, forms an angle of 5°±1° with the direction of the axis of rotation, which generatrix is axially extended to the outside by an arc of a circle 330 which connects said generatrix 310 to the wall 320 of a rim flange 32, said wall 320 being perpendicular to the direction of the axis of rotation and ending axially and radially to the outside in a rounded section 340. The dimensions of the generatrices 310 to 340 are standardized dimensions. As for the radially inner wall of the conical mounting ring 3, it is formed mainly of a recess 303 which is extended axially to the outside by a frustoconical part 301, the generatrix of which forms with the direction of the axis of rotation an angle which is open axially and radially towards the inside and is equal to 30°, which itself is extended by a generatrix 302, which in the example described is cylindrical, and the trace of the axially outer wall of the flange 32. All the generatrices 301 and 302 are in contact with the radially outer wall of the removable locking ring 2, said wall also being formed, when viewed in meridian section, by two generatrices 203 and 204 which have the same characteristics as the generatrices 301 and 302 respectively.

The locking ring 2 is composed of a vulcanized rubber mix 21 reinforced by a reinforcement ring which is a spring 20 of circular section obtained by helically winding adjacent metal coils of brass-coated steel of a diameter of 4 mm. In order to provide more cohesion to the locking ring 2 and to avoid detachment between the coils of the spring and to increase the resistance to deformation by transverse compression of the spring, the helical winding is effected around a continuous, circular element 22 of vulcanized rubber mix of a high Shore A hardness of 93. The radially inner face of the locking ring 2 of reinforced rubber is formed of two frustoconical generatrices 201 and 202 which come into contact and bear on the two frustoconical generatrices 101 and 102 respectively of the circular recess 10 created in the hub 1. Said generatrices form virtually an isosceles triangle with the extension of the cylindrical generatrix 11 of the hub 1, with two sides 101 and 102 which form with the direction of the axis of rotation or of the generatrix 11 which is parallel thereto an angle which is substantially equal to 35° and a base of sufficient axial width for at least one third of the diameter of the spring 20, which is the maximum radial dimension of the reinforcement ring 20, to be located within the virtual triangle defined above, which, in combination with the shape of the recess and the radially inner and outer shapes of the ring 2, permits the necessary axial blocking which is sufficient for holding said ring 2 under all travelling conditions. A strap 5 is wound around the meridian section of the reinforcement ring 20 of the locking ring 2 in order to permit, after deflation of the tire and displacement of the bead axially towards the inside, the dislodging of said ring 2 from its housing, the recess 10 of the hub 1.

The recess 303 in the axially inner part of the metal mounting ring 3 makes it possible to accommodate a positioning and centering system for the mounting assembly 2, 3 on the hub 1. Said system is composed of a chamber 8 or of a succession of chambers which cover a portion of the circumferential surface of the mounting ring of between 30% and 80% of the total surface area. Said chambers each contain an elastomeric gasket and are supplied with gas by a specific network 7 or by the inflation circuit for the tire, the gaskets being pushed back into the bottom of the chambers, thus blocking the openings xx' which may communicate with the outside or with the inside; part of the flow flows through the openings yy' and provides an air-cushion effect by leaking between the lips of the gasket and the hub. The pressure increase in the upper chamber $8_1$ pushes the gasket back and re-establishes the concentricity of the seat. Said state of concentricity and of suppression of friction first of all makes it possible to position the outer locking ring 2 and secondly to ensure the engagement of the parts 301 and 302 described above.

Figure 2:
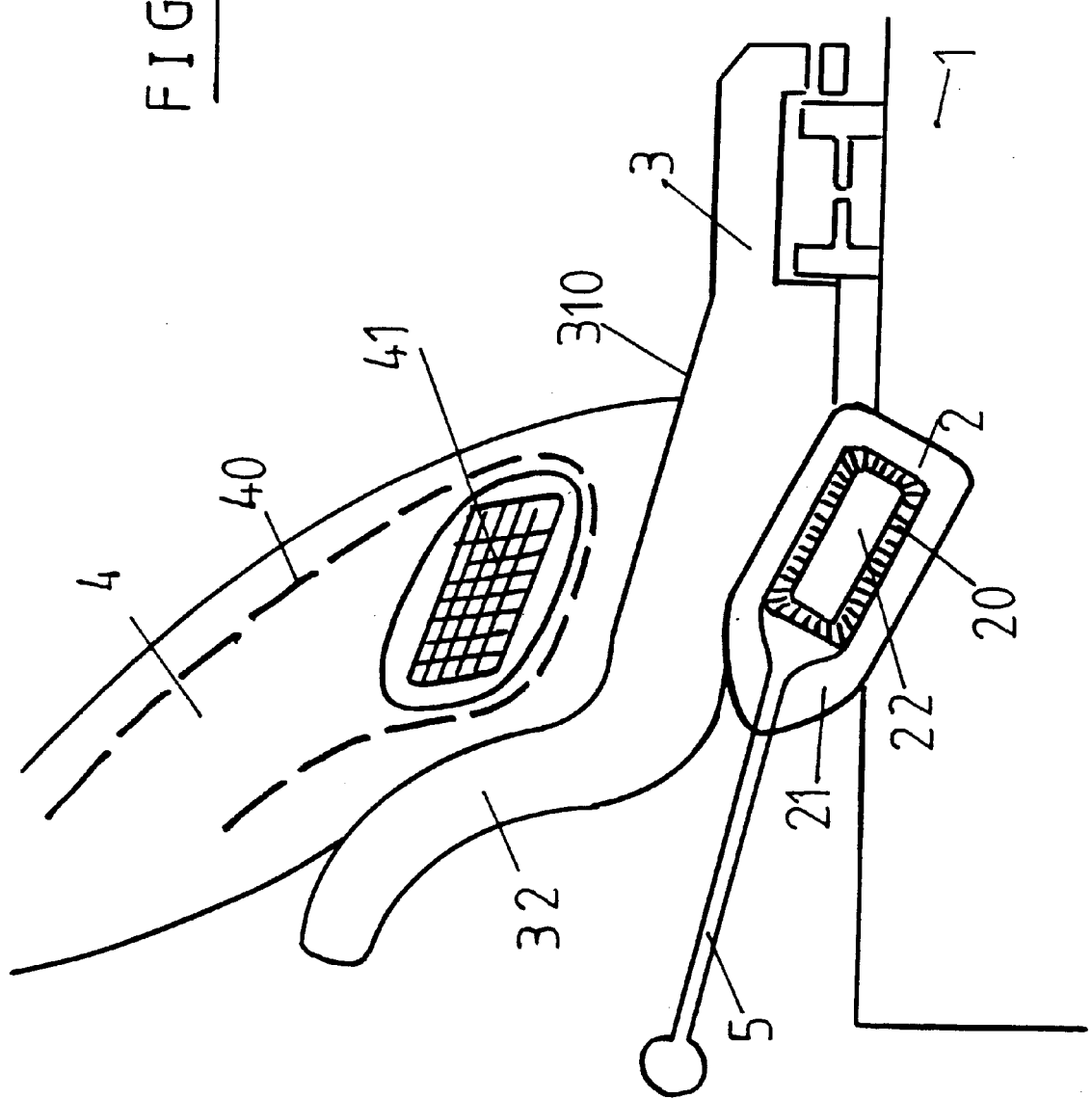
FIG. 2 shows, in the same manner, a second variant according to the invention.

FIG. 2 shows a mounting assembly applying the same principle as previously, the main differences from the previous example of FIG. 1 residing:

1) in the radially outer and axially inner profile of the mounting ring 3, said profile being a profile standardized to receive the beads of so-called "drop-center" tires, which profiles have in particular frustoconical ring seats inclined at 15° to the direction of the axis of rotation, 2) in the shape of the recess 10 of the hub 1 and consequently in the shape of the locking ring 2 and of the reinforcement ring 20.

If the virtually triangular shape of the recess 10 is considered, the latter is no longer an isosceles triangle, but has an axially outer side which is less inclined relative to the axis of rotation than the axially inner side. The necessary and sufficient locking action will be obtained with a suitable form of the reinforcement ring 20, which is a spring of rectangular section, two adjacent sides of which are parallel to the two sides of the virtual triangle of the recess 10.

Figure 3:
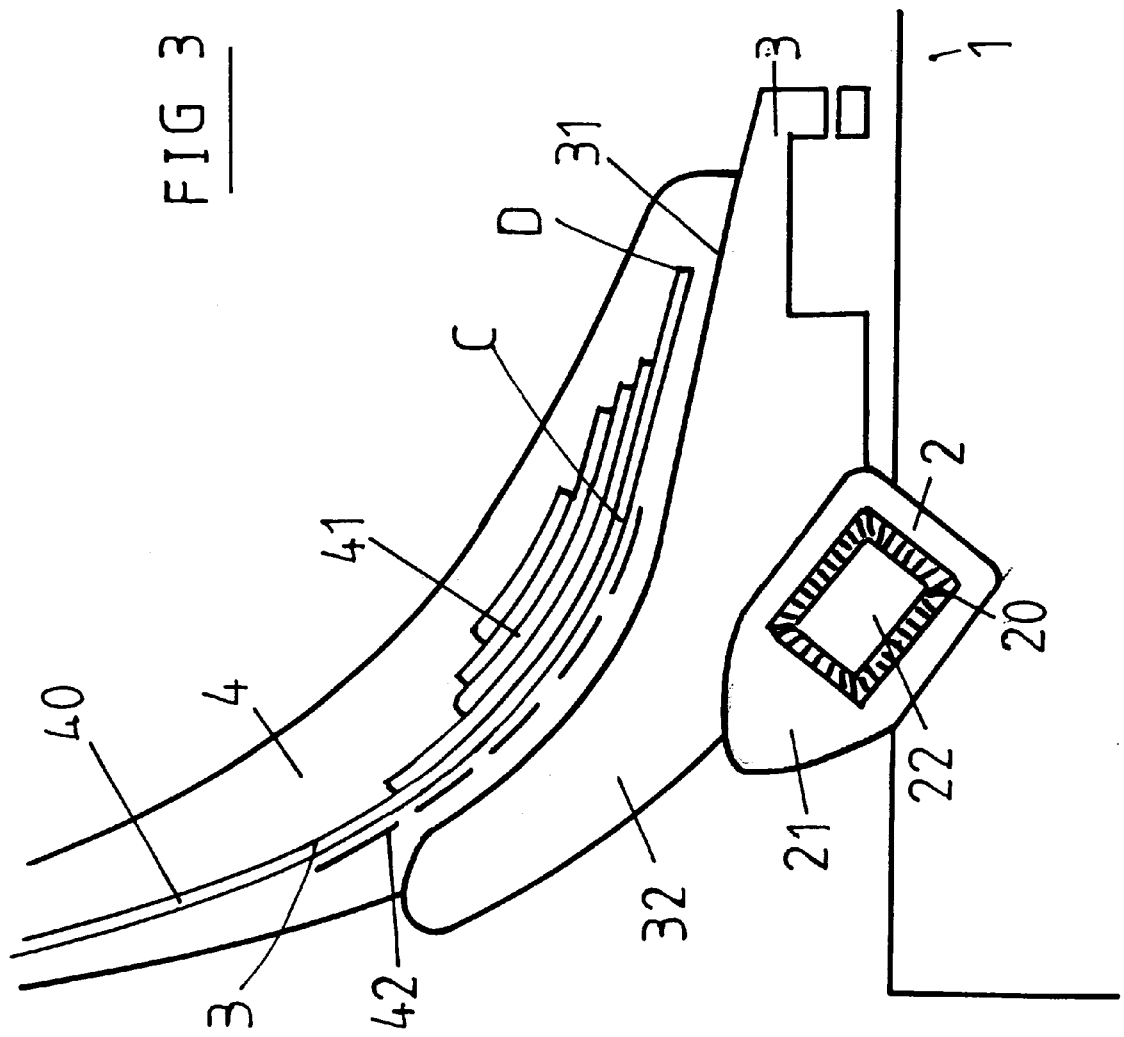
FIG. 3 shows a third variant.

Whereas the examples of FIGS. 1 and 2 use beads of conventional structure and shape to be mounted on walls of mounting rings which are standardized (TRA, ETRTO), the bead shown in FIG. 3 and the radially inner profile of the mounting ring which is adapted to said bead are not conventional. The bead of the tire shown in FIG. 3 does not have a bead wire, the functions of anchoring the carcass reinforcement and clamping on the rim being ensured by the presence of a plurality of reinforcements 41, 42 of suitable constitutions, which presence, combined with a meridian profile of carcass reinforcement such as described, for example, in International Application PCT/EP 98/06832, and the meridian profile of the seat of the mounting ring 31 possibly itself being adapted to the profile of the carcass reinforcement. The carcass reinforcement, in each bead, is reinforced, at least radially to the outside and axially to the inside, by at least one first continuous additional layer 41 comprising at least one first part composed of at least one ply formed of inextensible reinforcement elements which form an angle of between −2.5° and +2.5° with the circumferential direction. Axially to the outside and radially to the inside, there is advantageously arranged a second additional layer formed of at least one first part of at least one ply of inextensible, circumferential reinforcement elements. As for the meridian profile of the carcass reinforcement 40 in the bead of the tire, it is formed, in the extension of said profile in the sidewall, by a convex arc of a circle extended tangentially and axially to the inside by a straight-line segment CD, D being the end of the carcass reinforcement 40. The meridian profile of the radially inner wall 31 of the metal mounting ring 3, said wall being viewed in meridian section, is similar to the profile of the carcass reinforcement as defined above, since it is formed of an arc of a circle extended by a frustoconical generatrix. As for the rest of the mounting assembly and in particular the locking ring 2, it is practically identical to the ring described and illustrated in FIG. 2, except for the slightly modified dimensions.

Although only one rolling assembly composed of a single tire and its mounting assembly, mounted on a hub comprising only two recesses, has been described, it will not constitute a departure from the scope of the invention if the rolling assembly is composed of two twin-mounted tires: in this case, it is sufficient to have a single hub with four recesses.

I claim:

1. An assembly for mounting a tire without independent inner tube, comprising two conical metal mounting rings intended to receive the tire beads, characterized in that said two metal rings are positioned and locked in recesses on a hub of the vehicle by means of two circular lateral locking rings, each locking ring being composed of a vulcanized rubber mix reinforced by and coating a reinforcement ring which is circumferentially elastic and radially resistant to compression.

2. An assembly according to claim 1, characterized in that the coating mix of reinforcement ring has a secant modulus of elasticity at a relative elongation of 10% of at least 6 MPa.

3. An assembly according to claim 1, characterized in that a reinforcement ring is an annular spring with adjacent metal coils, each coil having a circular cross-section of a diameter of between 2 and 8 mm, which permits deformation of the coil under compressive force of less than 2%.

4. An assembly according to claim 3, characterized in that a continuous circular element of vulcanized rubber of high Shore A hardness is inserted into the coils of the spring in order to improve the compressive strength of said spring.

5. An assembly according to claim 3, characterized in that a continuous circular element of plastics material is inserted into the coils of the spring, said element being circularly discontinuous in order to maintain the elasticity of the spring.

6. An assembly according to claim 1, characterized in that a reinforcement ring is a succession of cylindrical elements of rigid material, said elements being of a length less than the diameter of the cylinder and joined together circumferentially by a rubber mix of high Shore A hardness.

7. An assembly according to claim 3, characterized in that a reinforcement ring, in order to facilitate the operations of demounting the tire and removing the locking ring, is provided with a strap which makes it possible to dislodge the ring from the recess in the hub by means of a tensile stress exerted on said strap.

8. An assembly according to claim 1, characterized in that each recess in the hub has a meridian section, the surface of which is virtually triangular with a base on the generatrix of the hub and with two sides forming acute angles which may be between 10° and 45° with the direction parallel to the axis of rotation, the two sides being joined opposite said base by a rounded apex.

9. An assembly according to claim 8, characterized in that the height of said virtual triangle, lowered by the rounded apex on said base, is between 10 and 45 mm.

10. An assembly according to claim 8, characterized in that the meridian section of a reinforcement ring, in its radially inner and outer parts, is elliptical, at least 25% of the maximum radial dimension of its meridian section being located within the triangular section of the recess formed in the hub.

11. An assembly according to claim 8, characterized in that the meridian section of a reinforcement ring, in its radially inner part, is polygonal with at least two sides substantially parallel to the two sides of the triangular section of the recess of the hub, and at least 25% of the maximum radial dimension of the meridian section of the ring being located within the triangular section of the recess formed in the hub.

12. An assembly according to claim 11, characterized in that the meridian section of a reinforcement ring, in its radially outer part, is polygonal with at least one frustoconical part, the generatrix of which forms an angle which may be between 15° and 35° with the direction of the axis of rotation.

13. An assembly according to claim 1, characterized in that each metal mounting ring is composed of at least one frustoconical rim seat, said seat being extended axially and radially to the outside by a rim flange, said flange being independent of the seat and being removable from said seat.

14. An assembly according to claim 13, characterized in that the radially outer wall of a mounting ring, viewed in meridian section, comprises at least one frustoconical generatrix forming an angle which may be between 0° and 16° with the direction of the axis of rotation, and extending said generatrix axially to the outside by means of an arc of a circle, the curve representing the axially inner and radially outer profile of the rim flange, said curve being located radially to the outside and axially to the inside of a straight-line segment joining the point of intersection of said curve with the frustoconical generatrix and that point of said curve which is farthest from the axis of rotation.

15. An assembly according to claim 13, characterized in that said mounting ring has a radially inner wall formed of at least one frustoconical part, the generatrix of which forms an angle of between 15° and 35° with the direction of the axis of rotation.

16. An assembly according to claim 13, characterized in that each mounting ring, in its axially inner part, is provided with a recess which makes it possible to accommodate a positioning and centering system for the mounting assembly on the hub.

17. An assembly according to claim 1, characterized in that each metal mounting ring is made integral with the bead of the tire.

\* \* \* \* \*